US012602565B1

(12) United States Patent
Partridge

(10) Patent No.: US 12,602,565 B1
(45) Date of Patent: Apr. 14, 2026

(54) SEWABLE IDENTIFIER TAG

(71) Applicant: Scannable NZ Limited, Wanaka (NZ)

(72) Inventor: Robert Partridge, Wanaka (NZ)

(73) Assignee: Scannable NZ Limited, Wanaka (NZ)

( * ) Notice: Subject to any disclaimer, the term of this patent is extended or adjusted under 35 U.S.C. 154(b) by 0 days.

(21) Appl. No.: 19/213,585

(22) Filed: May 20, 2025

(51) Int. Cl.
*G06K 19/077* (2006.01)
*G06K 19/07* (2006.01)

(52) U.S. Cl.
CPC ... *G06K 19/07762* (2013.01); *G06K 19/0723* (2013.01)

(58) Field of Classification Search
CPC .................... G06K 19/07762; G06K 19/0723
USPC ........................................................ 235/492
See application file for complete search history.

(56) References Cited

U.S. PATENT DOCUMENTS

| | | | | |
|---|---|---|---|---|
| 4,463,971 | A * | 8/1984 | Hoppe .............. | H01L 23/49855 |
| | | | | 235/487 |
| 8,608,080 | B2 * | 12/2013 | Finn ..................... | H01Q 1/2225 |
| | | | | 235/487 |
| 10,534,988 | B2 * | 1/2020 | Bauer ................ | G08B 13/2434 |
| 2004/0129788 | A1 * | 7/2004 | Takahashi ............ | G06K 19/145 |
| | | | | 235/492 |
| 2015/0379386 | A1 * | 12/2015 | Droz .................... | G06K 19/077 |
| | | | | 235/492 |

* cited by examiner

*Primary Examiner* — Michael G Lee
*Assistant Examiner* — David Tardif
(74) *Attorney, Agent, or Firm* — Holzer Patel Drennan

(57) ABSTRACT

Described herein is a sewable identifier label, an item with a sewable identifier label, and methods of manufacture and assembly. The sewable identifier label may be a laminate enclosing an identifier tag that is relatively thin, highly pliable, and highly resilient. The item to which the sewable identifier label may be fixed may be an item that is also pliable and which in use may be moved in multiple directions and/or dimensions.

19 Claims, 6 Drawing Sheets

SEWABLE IDENTIFIER TAG

TECHNICAL FIELD

Described herein is a sewable identifier label, an item with a sewable identifier label and methods of manufacture and assembly. More specifically, a sewable identifier label is described comprising a unique identifier tag configured to be located on an item such as a soft or pliable material that may be used to identify the item to which the sewable identifier label is sewn onto.

BACKGROUND ART

Identifier tags such as UHF RFID tags and NFC tags are widely used in a variety of ways to provide information about a particular item or items.

Some safety equipment such as a harness or sling used in fall safety and climbing are an item that ideally is tracked in terms of use during the life of the item to allow a user to determine inspection history, duration or use, longevity and hence, safety.

Items like a sling present a challenge in terms of identifier label fixing since the sling and material used to form the sling is pliable and moves in a variety of directions during use and storage. The sling may also be subject to frequent wear, abrasion and knocks. The sling also must not have any snag points or obstructions to rope or carabiner movement through or about the sling. In a sling scenario, the identifier label should also ideally have a high degree of resilience to ensure a long life. In the inventors' experience, there is no solution for a sling to comprise an identifier tag that did not compromise the sling or identifier tag used. Other products with soft or pliable materials may also have similar problems for identifier tag placement.

TexTrace™ produced by Avery Dennison and described further in U.S. Pat. No. 10,534,988 is one identifier label using RFID inlays to form a label adhered to fabric items such as garments. While this identifier label may be useful, the identifier label lacks mechanical durability over an extended lifespan. Printed circuits including inlays are prone to failure from repetitive flexing, folding and rolling of the inlay printed circuit. In applications where the label is likely to face abrasion, flexing, folding or rolling, an inlay has a limited lifetime which may limit the range of applications for the label. Inlays may be useful for example for clothing retailers (short term storage and use) but fail once used by the consumer and are generally removed by the consumer in any case for comfort (longer term use). Inlays may also not be robust enough for safety equipment such as slings or harnesses and the like which experience greater impacts and abrasion than clothing garments and which also demand high reliability.

Jacquard labels are used to retain an identifier tag within a pocket. Jacquard material is cut to suit the identifier tag shape e.g. rectangular, bonded on three sides, the identifier tag inserted and then the open side is sewn to an item to be tracked. A Jacquard label is relatively thin but this method requires extra labour and time plus the identifier tag can move around inside the pocket.

Inlay printed circuits are prone to failure from flexing and folding of the inlay printed circuit. For use on a soft or pliable material, the ability to endure flexing, folding or rolling may be important.

A further method may be to use satin fabric adhered over an identifier tag. This approach again is labour intensive and is prone to delamination over time and flexing/movement of the satin, adhesive and identifier tag.

It may be useful to provide an alternative form of identifier label including an identifier tag that is sewable and which addresses at least one of the above problems, or which at least provides the public with a choice.

Further aspects and advantages of the sewable identifier label and methods of manufacture and assembly will become apparent from the ensuing description that is given by way of example only.

SUMMARY

Described herein is a sewable identifier label, an item with a sewable identifier label and methods of manufacture and assembly. The sewable identifier label may be a laminate enclosing an identifier tag that is relatively thin, highly pliable and highly resilient. The item to which the sewable identifier label may be fixed may be an item that is also pliable and which in use may be moved in multiple directions and/or dimensions.

In a first aspect, there is provided a sewable identifier label configured to be sewn to an item comprising:
- an identifier tag comprising first and second faces, the identifier tag enclosed within a laminate;
- wherein the laminate comprises:
  - a first porous fabric layer configured to cover the first face of the identifier tag and an area surrounding the identifier tag;
  - a second porous fabric layer configured to cover the second face of the identifier tag and an area surrounding the identifier tag;
  - a moisture resistant adhesive applied between:
    - the first porous fabric layer and the first face of the identifier tag;
    - the second porous fabric layer and the second face of the identifier tag; or
    - both the first porous fabric layer and the first face of the identifier tag and the second porous fabric layer and the second face of the identifier tag; and
  - wherein, when laminated, the adhesive is located at least partly through pores of the first porous fabric layer and pores of the second porous fabric layer and encloses the identifier tag between the first porous fabric layer, the second porous fabric layer and the adhesive.

In a second aspect, there is provided a sewable identifier tag comprising:
- an identifier tag, the identifier tag being a flexible printed circuit (FPC) RFID or NFC tag, the identifier tag enclosed within a laminate, wherein the laminate comprises:
  - a first layer configured to cover the first face of the identifier tag and an area surrounding the identifier tag;
  - a second layer configured to cover the second face of the identifier tag and an area surrounding the identifier tag; and
  - an adhesive that adheres together, the first layer, the second layer and the identifier tag.

In a third aspect, there is provided a reel comprising multiple sewable identifier labels substantially as described above, the multiple sewable identifier labels connected in series and rolled to form a reel shape.

In a fourth aspect, there is provided an item comprising sewn thereon, a sewable identifier label substantially as described above.

In a fifth aspect, there is provided a method of manufacture of a sewable identifier label by:

selecting laminate items comprising: a first porous fabric layer, a second porous fabric layer, a moisture resistant adhesive and, an identifier tag with a first face and opposing second face;

arranging the laminate items so that:

the first porous fabric layer abuts the first face of the identifier tag;

the second porous fabric layer abuts the second face of the identifier tag;

adhesive is located between:

the first porous fabric layer and the identifier tag; or the second porous fabric layer and the identifier tag; or both the first porous fabric layer and the identifier tag and the second porous fabric layer and the identifier tag; and laminating the laminate items together wherein, lamination causes the adhesive to spread through the pores of the first fabric layer and the pores of the second fabric layer and encloses the identifier tag between the first porous fabric layer, the second porous fabric layer and the adhesive.

In a sixth aspect, there is provided a method of fitting a sewable identifier label to an item by:

selecting the sewable identifier label substantially as described above;

selecting an item to which the sewable identifier label is to be sewn on; and sewing the sewable identifier label onto the item.

Advantages of the above sewable identifier label, an item with a sewable identifier label and methods of manufacture and assembly comprise one of more of:

Long lifetime and robustness (10+ years);

Enclosure of the identifier tag avoiding damage from exposure to the environment;

The ability to retrofit or fit on manufacture, the sewable identifier label;

The ability to adapt placement of the sewable identifier label to suit a variety of item shapes, applications and designs;

The ability to reliably track unique aspect of a specific item to which the sewable identifier label is placed;

Simple method (sewing) of fitting of the sewable identifier label to the item;

Simple manufacture of the sewable identifier label;

Versatility in orientation of the sewable identifier label on the item;

Relatively low cost especially when compared to the longevity of the sewable identifier label relative to prior art products with less longevity and more rigid structure;

Able to be washed and dried multiple times (>15 times);

Flexible for use in fabric or similar flexing items;

Durable with respect to not delaminating and not having the identifier tag circuitry fail;

Relatively thin and pliable and hence compliant with the item to which it is sewn to and hence more comfortable and versatile for clothing or other items of this nature;

The sewable identifier label protects the identifier tag itself from chemical or physical damage;

The sewable identifier label is minimally intrusive.

BRIEF DESCRIPTION OF THE DRAWINGS

Further aspects of the sewable identifier label, an item with a sewable identifier label and methods of manufacture and assembly will become apparent from the following description that is given by way of example only and with reference to the accompanying drawings in which.

DETAILED DESCRIPTION

Figure 1:
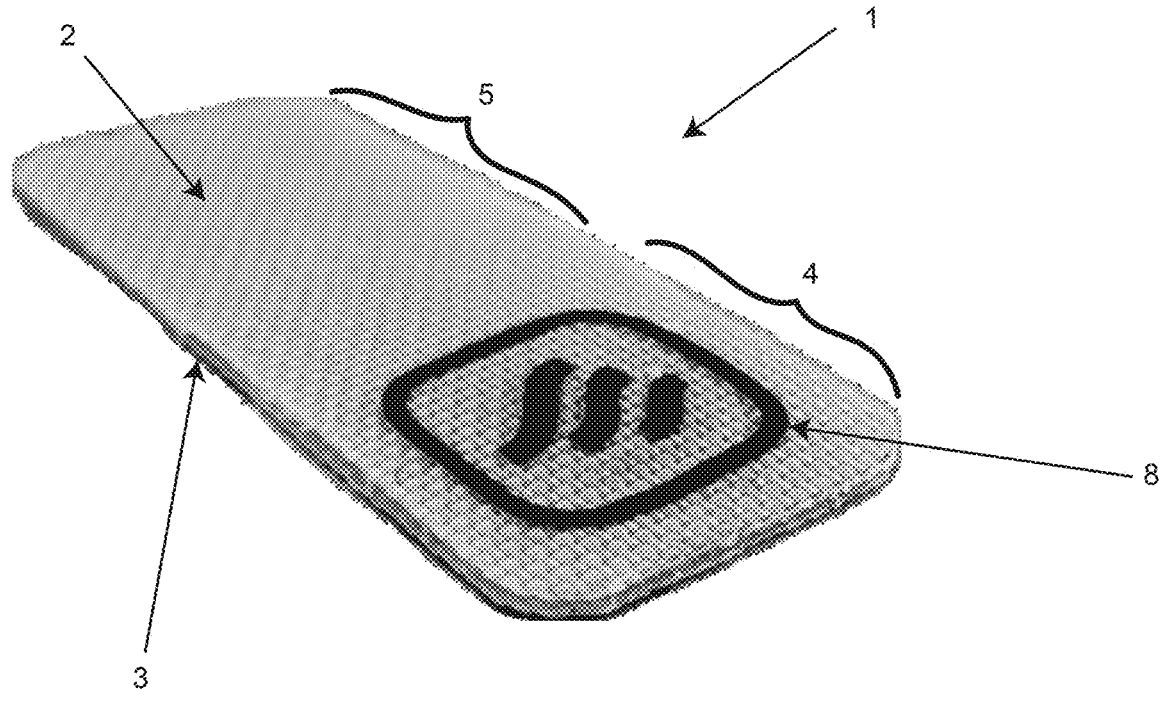
FIG. 1 shows a perspective view of a first embodiment of sewable identifier label in a flat form.

As noted above, described herein is a sewable identifier label, an item with a sewable identifier label and methods of manufacture and assembly. The sewable identifier label may be a laminate enclosing an identifier tag that is relatively thin, highly pliable and highly resilient. The item to which the sewable identifier label may be fixed may be an item that is also pliable and which in use may be moved in multiple directions and/or dimensions.

For the purposes of this specification, the term 'about' or 'approximately' or 'substantially' and grammatical variations thereof mean a quantity, level, degree, value, number, frequency, percentage, dimension, size, amount, weight or length that varies by as much as 30, 25, 20, 15, 10, 9, 8, 7, 6, 5, 4, 3, 2, or 1% to a reference quantity, level, degree, value, number, frequency, percentage, dimension, size, amount, weight or length.

The term 'comprise' and grammatical variations thereof shall have an inclusive meaning—i.e. that it will be taken to mean an inclusion of not only the listed components it directly references, but also other non-specified components or elements.

Sewable Identifier Label

In a first aspect, there is provided a sewable identifier label configured to be sewn to an item comprising:

an identifier tag comprising first and second faces, the identifier tag enclosed within a laminate;

wherein the laminate comprises:

a first porous fabric layer configured to cover the first face of the identifier tag and an area surrounding the identifier tag;

a second porous fabric layer configured to cover the second face of the identifier tag and an area surrounding the identifier tag;

a moisture resistant adhesive applied between:

the first porous fabric layer and the first face of the identifier tag;

the second porous fabric layer and the second face of the identifier tag; or both the first porous fabric layer and the first face of the identifier tag and the second porous fabric layer and the second face of the identifier tag; and wherein, when laminated, the adhesive is located at least partly through pores of the first porous fabric layer and pores of the second porous fabric layer and encloses the identifier tag between the first porous fabric layer, the second porous fabric layer and the adhesive.

In a second aspect, there is provided a sewable identifier tag comprising:

an identifier tag, the identifier tag being a flexible printed circuit (FPC) RFID or NFC tag, the identifier tag enclosed within a laminate, wherein the laminate comprises:

a first layer configured to cover the first face of the identifier tag and an area surrounding the identifier tag;

a second layer configured to cover the second face of the identifier tag and an area surrounding the identifier tag; and an adhesive that adheres together, the first layer, the second layer and the identifier tag.

Sewable

The sewable identifier label is configured to be sewn to an item.

The sewable identifier label is sufficiently thin to be able to be sewn to a fabric or similar item. The term 'sufficiently thin refers to a final thickness and material density of the sewable identifier label which does not cause problems for the sewing machines sewing the finished goods, and without too much additional force required by the sewing machine evidenced by the sound of the machine.

The sewable identifier label may have a thickness of less than 1.5 mm about the identifier tag itself.

The sewable identifier label may have a thickness of less than 1 mm about an area surrounding the identifier tag within. The thickness may be around 0.8 mm+/−0.02 mm in non-tag position Shape The sewable identifier label may be manufactured to have a variety of forms such as a round, polygonal shape or varied shape outlines.

From the side, the sewable identifier label may appear as one thin strip, as noted being less than 1.5 mm at a thickest point about the identifier tag itself and thinner about the surrounding the identifier tag.

Typically the identifier label envisaged for this sewable identifier label product may have a first face, a second face and sides. The identifier label may be polygonal, circular, elliptical or rectangular in length and width.

Identifier Tag

A variety of identifier tag types may be used. In one example, the identifier tag may be a Near Field Communication (NFC) tag. The identifier tag may be a ultra-high frequency (UHF) radio frequency identification (RFID) tag. Other identifier tag types may also be used without departing from the invention.

UHF RFID tags operate by identifying and tracking items via radio waves over distances of up to 7-10 m and they do not require a line of sight to a reader for a signal to be received.

NFC is a wireless technology that allows for short range wireless communication between an identifier tag and a reader. NFC tags require deliberate action from the user and this makes these tags highly secure and user interactive. NFC tags support two-way communication while RFID tags are only one-way communication enabling more interactive and dynamic applications. NFC tags can also store more complex data than RFID. NFC tags can employ encryption and authentication protocols as well to increase security.

The identifier tag may operate at a frequency of 13.56 MHz.

The identifier tag may comprise an antenna and an integrated circuit (IC). The printed circuit board PCB may be the antenna. The identifier tag may further comprise an isolator.

The identifier tag including the IC may be flexible i.e. is a flexible printed circuit (FPC). It should be noted that the identifier tag avoids use of a printed circuit board (PCB) which are rigid. FPCs (Flexible Printed Circuits) are flexible, allowing for bending and folding, making them suitable for applications described herein where space is limited or where the circuit needs to conform to irregular shapes.

The tag is not an inlay i.e. is not an RFID inlay or NFC inlay. Based on the inventor's experience, inlay RFID/NFC tags are prone to failure when flexed or folded multiple times. Inlay RFID/NFC tags are commonly used for thin-label solutions, but are not durable enough when flexed and the bond between the IC and the antenna does not survive the flexing. FPC NFC tags have a more durable connection between the IC and the antenna, so may be useful for a durable solution in the context of this sew-in label.

The identifier tag may be used to track an item. Tracking may occur at one or more points in the life of the item such as for example, during manufacture, transport, retail and sale, post-sale and during consumer use. Tracking may also be useful to provide 'end-of-useful-life' instructions such as describing ways to access the materials used and how to handle (recycle, dispose, etc).

The identifier tag may be fixed in place within the laminate material. That is, the identifier tag is not enclosed in a pocket of fabric and free to move relative to the pocket.

The identifier tag may be relatively small e.g. 2-6 mm in length and/or width. The identifier tag in this example may have a first face and an opposing second face and sides. While these dimensions may be used, the inventor has found that almost any shape and size of identifier tag may be used to form the sewable identifier label and these dimensions and sides are not intended to be limiting.

The identifier label and identifier tag therein may identify to a reader, the unique id of the item to which it is sewn on. The unique id may be linked to history of the item such as date of purchase, manufacturer, extent of use and so on. The unique id may be used to record inspection results about the item to which the sewable identifier label is sewn to. This may be critical to safety and to tracking of equipment use. This may also be a way to ensure authenticity of the item.

Item

The item to which the sewable identifier label may be sewn to is envisaged as being a pliable fabric. Fabrics move in a variety of directions and in turn, an identifier label capable of conforming with the fabric movement and not being damaged may be useful. The item to which the sewable identifier label may be sewn to may take one of many different forms, some examples being clothing, a sling, webbings and so on. Use on safety equipment is one example where tracking of the item use and other factors may be particularly useful.

Laminate/Lamination

The laminate or grammatical variations thereof noted herein may refer to multi-layered structures, in this sewable identifier label configured to protect an identifier tag between the layers of the laminate.

Fabric Layer

As described, the laminate comprises two fabric layers. Additional fabric layers may be used, for example to increase the strength however, this may compromise the ability to sew the sewable identifier label. Properties of thinness, bending and rolling may be desired and multiple layers unless thin themselves may detract from these properties.

The term 'porous' refers to a porosity prior to lamination of the first or the second fabric layer. This porosity may be configured to allow the adhesive to move through the pores during laminating and so capture the fabric layers and identifier tag together in a water resistant film. The porosity of the first or second fabric layer may typically range from 200-800 cm$^3$/cm$^2$/sec at a pressure differential of 125 Pa. A coated 400D nylon similar to what may be used in waterproof gear or packs, often has nearly zero porosity. This may be because the coating fills in any gaps between fibres so that water and air cannot pass through the fabric layer.

The fabric layers may be manufactured from a fabric with a denier of 40-800D, or 300-500, or 350-450, or approximately 400D. The relatively open but very strong nature of this grade of fabric may be useful as it provides a fabric that is porous enough to receive the adhesive through the pores. As may be appreciated, there is a correlation between denier and thread count (number of threads in a given distance). It is the combination of denier, thread count and coatings (or lack of) that defines how porous a fabric face is.

The strength is also important to the longevity of the sewable identifier label. Fabric of this denier are known to be high density and very robust known outdoor grade fabric yet is still lightweight and workable and easy to sew.

The fabric layer density may be approximately 5-400, or 55-300, or 200-250 or 210-220 g/m2 or gsm The fabric layers may be manufactured from woven fabrics. Alternatively, non-woven fabric layers may also be used e.g. a felt. One fabric layer may be woven and the other non-woven as well. While both woven and non-woven fabric layers may be used, non-woven fabric layers may be more tear resistant, as they do not have inherent lines of weakness, along the lengths of the warp and weft fibres bending around each other, unlike woven fabric layers.

The fabric layers may be manufactured from polymers. Example polymers may be polypropylene (PPE), polyester, polyaramid, or nylon.

Adhesive

The adhesive may be a thermoplastic adhesive. This may be applied to one or both of the fabric layers prior to laminating and may spread during lamination to pass through the fabric layer pores and about the identifier tag.

The adhesive may be applied to the fabric layer(s) as a continuous layer. Post lamination, the adhesive forms a continuous, non-permeable film about the fabric layers and identifier tag. The term 'about' in this context refers to the adhesive being:

covering part or all of the fabric layer(s); and/or between part or all of the fabric layer(s).

The adhesive may for example fully enclose the fabric layer(s). Alternatively, the adhesive may form a film between part or all of one side of a fabric layer and an opposing fabric layer. The adhesive may be a hot melt adhesive. Hot melt adhesives used in lamination typically consist of a combination of polymers, resins, waxes, and antioxidants. Polymers in the hot melt adhesive may form the backbone of the adhesive and provide strength and chemical resistance. Common example polymers may include:

EVA melts. Polyolefins (PO): These include polyethylene and polypropylene, offering good adhesion to various materials;

Polyurethane (PUR): PUR adhesives provide strong bonds and are suitable for high-performance applications;

Styrene block copolymers (SBC): These offer good low-temperature flexibility and are used in pressure-sensitive hot melts; and polyethylene (PE).

Resins, often rosin resins, may be added to enhance tack and bonding. Waxes and oils may be used as plasticisers, and antioxidants prevent degradation.

The hot melt adhesive may be a film of adhesive that may be placed, dry, between layers of fabric, and which melts or becomes fluid or semi-fluid under heat and pressure, to laminate the layers together.

The adhesive may be moisture-resistant. The adhesive may form a non-permeable layer.

The identifier tag may be adhered to and covered by the adhesive and fabric layer(s). The identifier tag is unable to move relative to the fabric layer(s) due to the adhesive.

Shape

The sewable identifier label may be rectangular shaped although the outline of the sewable identifier label may comprise many different shapes and forms depending on how the sewable identifier label is cut. The identifier tag itself may be rectangular hence the overall sewable identifier label may be rectangular as well, the fabric layers and adhesive forming a border around the identifier tag.

The identifier tag may be offset relative to the centre of the shape of the sewable identifier label. This may be useful to allow a somewhat larger region for sewing that is absent of the identifier tag itself.

The sewable identifier label may for example be less than 50, or 45, or 40, or 35 mm long and less than 25 or 20, or 15 mm wide.

Writable

The sewable identifer label may be writable thereon. Writing may include indicia generally and not just words, numbers or letters. Logos and the like may be written on the sewable identifier label. The writing may be on the fabric layer(s) themselves. The writing may be added to the sewable identifier label after lamination (hence on the adhesive once laminated). The fabric layer(s) may be transparent at least to some extent and writing on the identifier tag may be visible through the fabric layer(s) and adhesive.

Reel of Labels

In a third aspect, there is provided a reel comprising multiple sewable identifier labels substantially as described above, the multiple sewable identifier labels connected in series and rolled to form a reel shape.

To use, the reel may be fitted to a dispenser and an end of the reel of sewable identifier labels run through a label printer to set a unique ID for a single or group of identifier labels, the sewable identifier label or labels then cut and dispensed. A challenge with the format of durable fabric labels, is that they may need to be associated to the product e.g. a sling as it is being produced, and often to the serial number of the item being produced. Processing many labels means scanning and linking the identifier tag to the correct products which can be time consuming. Passing the sewable identifier labels through a tag reader/writer during manufacture will let the user associate the label identifier IDs with the part number of the items much quicker during manufacture.

Item and Label

In a fourth aspect, there is provided an item comprising sewn thereon, a sewable identifier label substantially as described above.

The sewable identifier label may be stitched to the item via a single stich line. The single stitch line may be a straight or generally straight line. The sewable identifier label may be bar-tacked to the item or sewn to the item at a bar-tack point.

As noted above, the item to which the sewable identifier label may be sewn to is envisaged as being a pliable fabric. Fabrics move in a variety of directions and in turn, an identifier tag capable of confirming with the fabric movement and not being damaged may be useful. The fabric may be of many different forms, some examples being clothing, a sling, webbings and so on. Use on safety equipment is one example where tracking of the item use and other factors may be particularly useful.

The sewable identifier label may be sewn onto the item during manufacture of the item. Alternatively, the sewable identifier label may be sewn onto the item at a time post manufacture.

Method of Manufacture

In a fifth aspect, there is provided a method of manufacture of a sewable identifier label by:

selecting laminate items comprising: a first porous fabric layer, a second porous fabric layer, a moisture resistant adhesive and, an identifier tag with a first face and opposing second face;

arranging the laminate items so that:

the first porous fabric layer abuts the first face of the identifier tag;

the second porous fabric layer abuts the second face of the identifier tag;

adhesive is located between:

the first porous fabric layer and the identifier tag; or the second porous fabric layer and the identifier tag; or both the first porous fabric layer and the identifier tag and the second porous fabric layer and the identifier tag; and laminating the laminate items together wherein, lamination causes the adhesive to spread through the pores of the first fabric layer and the pores of the second fabric layer and encloses the identifier tag between the first porous fabric layer, the second porous fabric layer and the adhesive.

Laminating may occur at a pressure of 1 to 12 kg, or 1 to 9 kg, or 3 to 6 kg. Laminating may occur for a time period of 1 to 45, or 5-30, or 10-25, or approximately 15 seconds. Laminating may occur at a temperature from 50-400, or 50-300, or 100-200° C.

Method of Fitting

In a sixth aspect, there is provided a method of fitting a sewable identifier label to an item by:

selecting the sewable identifier label substantially as described above;

selecting an item to which the sewable identifier label is to be sewn on; and sewing the sewable identifier label onto the item.

Advantages

Advantages of the above sewable identifier label, an item with a sewable identifier label and methods of manufacture and assembly comprise one of more of:

Long lifetime and robustness (10+ years);

Enclosure of the identifier tag avoiding damage from exposure to the environment;

The ability to retrofit or fit on manufacture, the sewable identifier label;

The ability to adapt placement of the sewable identifier label to suit a variety of item shapes, applications and designs;

The ability to reliably track unique aspect of a specific item to which the sewable identifier label is placed;

Simple method (sewing) of fitting of the sewable identifier label to the item;

Simple manufacture of the sewable identifier label;

Versatility in orientation of the sewable identifier label on the item;

Relatively low cost especially when compared to the longevity of the sewable identifier label relative to prior art products with less longevity and more rigid structure;

Able to be washed and dried multiple times (>15 times);

Flexible for use in fabric or similar flexing items;

Durable with respect to not delaminating and not having the identifier tag circuitry fail;

Relatively thin and pliable and hence compliant with the item to which it is sewn to and hence more comfortable and versatile for clothing or other items of this nature;

The sewable identifier label protects the identifier tag itself from chemical or physical damage;

The sewable identifier label is minimally intrusive.

The embodiments described above may also be said broadly to consist in the parts, elements and features referred to or indicated in the specification of the application, individually or collectively, and any or all combinations of any two or more said parts, elements or features.

Further, where specific integers are mentioned herein which have known equivalents in the art to which the embodiments relate, such known equivalents are deemed to be incorporated herein as if individually set forth.

WORKING EXAMPLES

The above described sewable identifier label, an item with a sewable identifier label and methods of manufacture and assembly are now described by reference to specific examples and item numbering below:

1 Sewable identifier label
2 First face
3 Second face
4 Tag area
5 Area surrounding the tag
6 Thickness at tag
7 Thickness away from the tag
8 Indicia on the label
9 Sew line
10 Identifier tag
20 First porous fabric layer
30 Second porous fabric layer
40 Adhesive
50 Reel
100 item Example 1

Referring initially to FIG. 1, a sewable identifier label 1 (label 1 hereafter) is shown. The label 1 comprises an identifier tag 10 comprising first and second faces, the identifier tag 10 enclosed within a laminate. The laminate comprises porous fabric layers 20, 30 on either side of the identifier tag 10 and an area 5 surrounding the identifier tag 10. When laminated, adhesive 40 spreads through the pores of the fabric layers 20, 30 and encloses the identifier tag 10 between the fabric layers 20, 30. The label 1 is shown in a rectangular shape however round, polygonal shape or varied shape outlines may be used.

The label 1 can be sewn to an item 100 such as a fabric or similar item. In the example shown, this may be a point distant to the identifier tag 10.

The label 1 as shown has a thickness 6 of less than 1.5 mm about the identifier tag 10 itself and a thickness 7 of less than 1 mm about an area 5 surrounding the identifier tag 10 within.

Typically the label 1 may have a first face 2, a second face 3 and sides as shown in FIG. 1. The label 1 may be polygonal, circular, elliptical or rectangular in length and width.

Writing or other indicia 8 may be applied to the label 1 such as that shown in FIG. 1. The writing 8 may be added to the label 1 after lamination (hence on the adhesive 40 once laminated) as shown in FIG. 1 or may be on the identifier tag 10 and visible through the fabric layer(s) 20 or 30 and adhesive 40.

Figure 2:
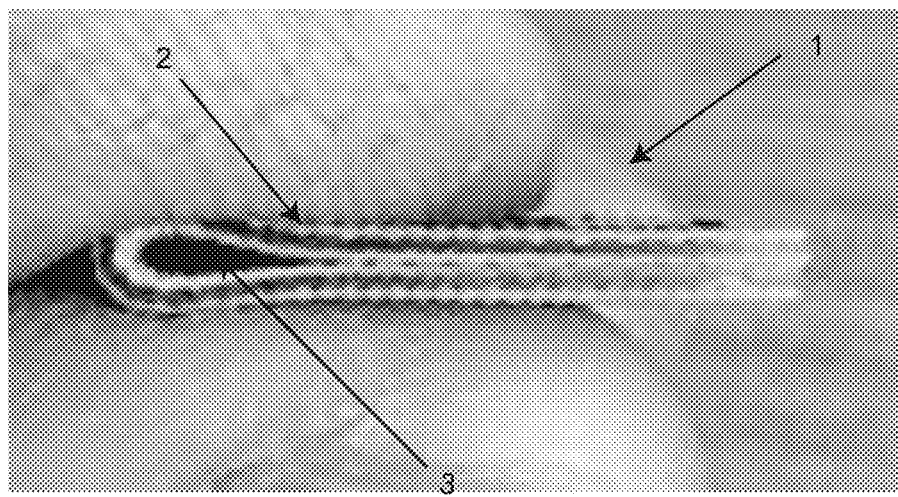
FIG. 2 shows a side elevation view of the above sewable identifier label when folded in half lengthwise.
Figure 3:
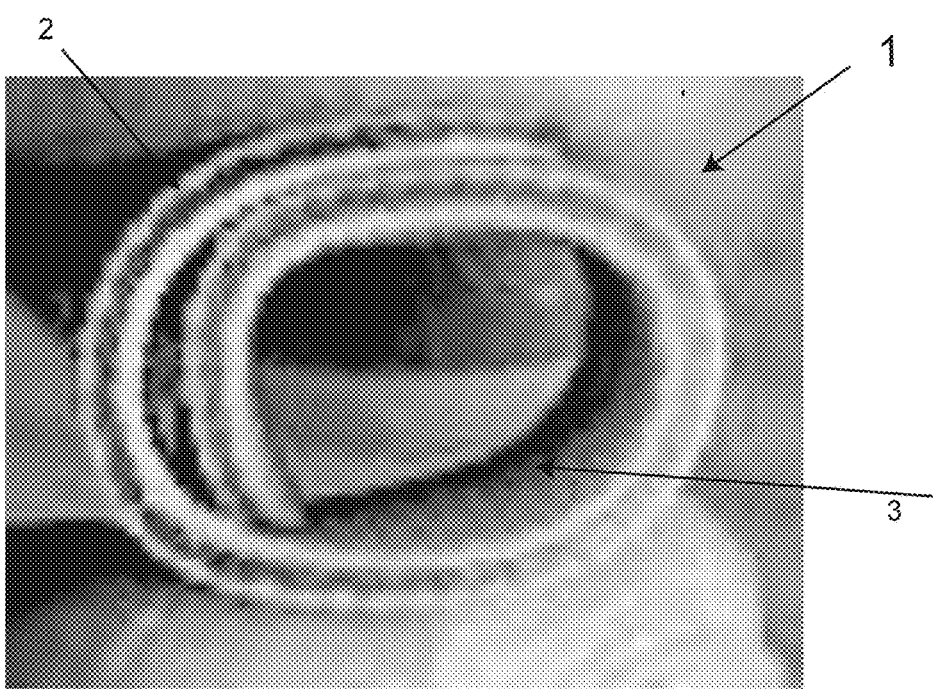
FIG. 3 shows a side elevation view of the above sewable identifier label when rolled up.
Figure 4:
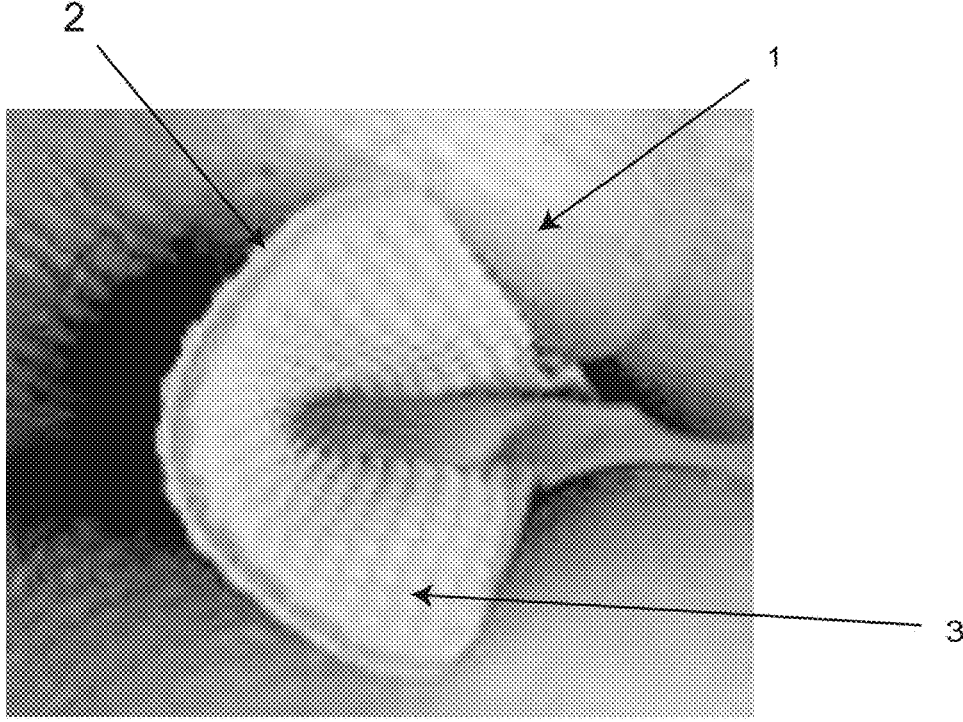
FIG. 4 shows a side elevation view of the above sewable identifier label when folded in half width wise.

FIGS. 2-4 shows the label 1 in various shapes that the label 1 is configured to be moved to such as a bent shape, a rolled shape or a folded shape. The label 1 has sufficient shape memory to only elastically deform to the shapes shown and return to the original flat shape shown in FIG. 1.

Figure 5:
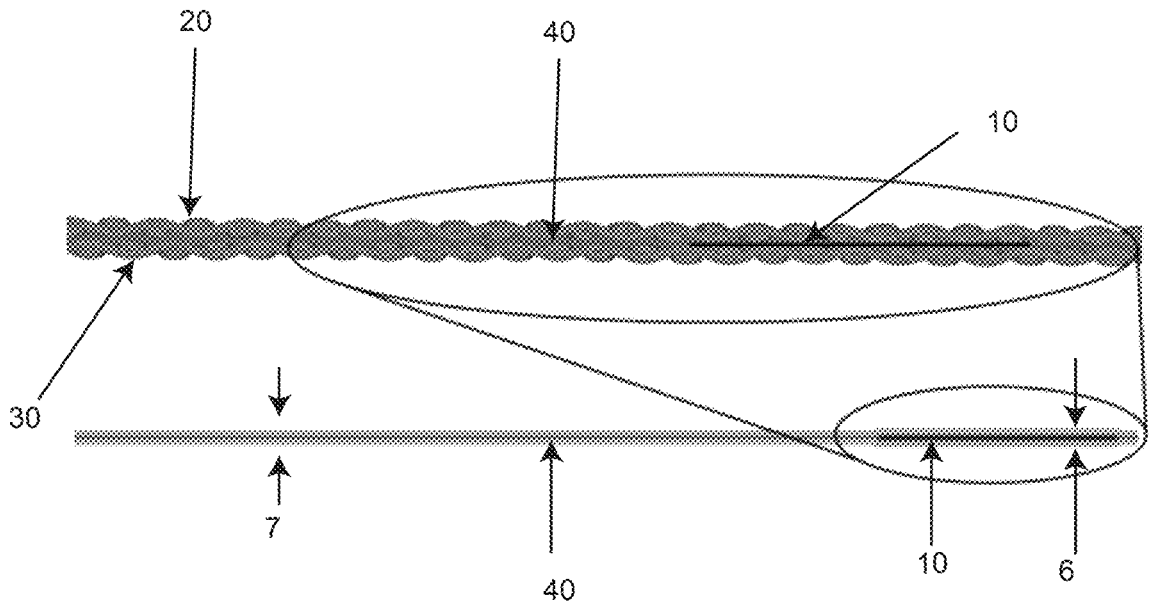
FIG. 5 shows a schematic exploded view of the side of the above sewable identifier label to illustrate the different layers.

FIG. 5 shows an example of the label 1 layers before lamination (top) and after lamination (bottom).

The fabric layers 20, 30 have a porosity sufficient to allow the adhesive 40 to move through the pores during laminating and so capture the fabric layers 20, 30 and identifier tag 10 together in a water resistant film. The fabric layers 20, 30 may be manufactured from a fabric with a denier of 40-800D and the fabric layer 20, 30 density may be approximately 5-400 g/m2 or gsm. The fabric layers 20, 30 may be manufactured from woven or non-woven fabrics and from polymer fibres such as from polypropylene (PPE), polyester, polyaramid, or nylon fibres.

A variety of identifier tag 10 types may be used. In the example shown, the identifier tag 10 may be a Near Field Communication (NFC) tag or UHF RFID tag. The identifier tag 10 may comprise an antenna and an integrated circuit (IC). The printed circuit board PCB may be the antenna. The identifier tag 10 may further comprise an isolator. As observed in FIGS. 2-4, the identifier tag 10 including the IC is flexible i.e. is a flexible printed circuit (FPC).

Figure 6:
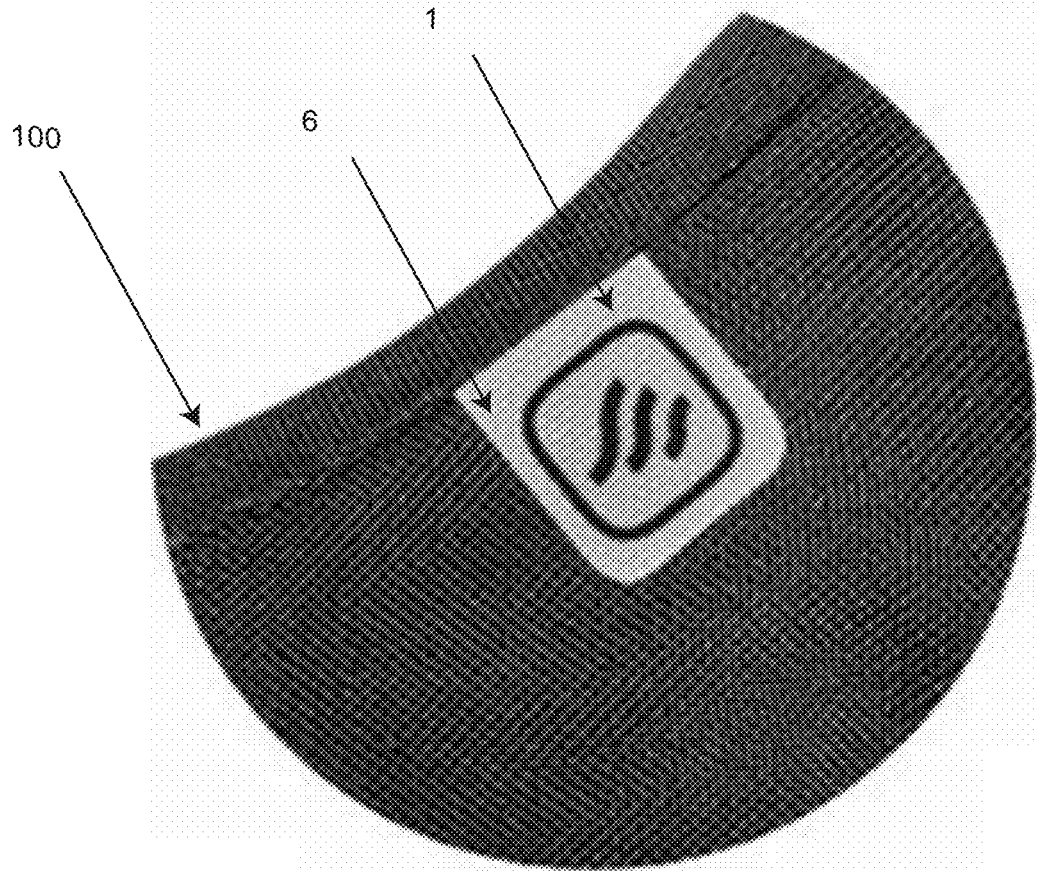
FIG. 6 shows an image of the sewable identifier label stitched to a straight binding of an object.
Figure 7:
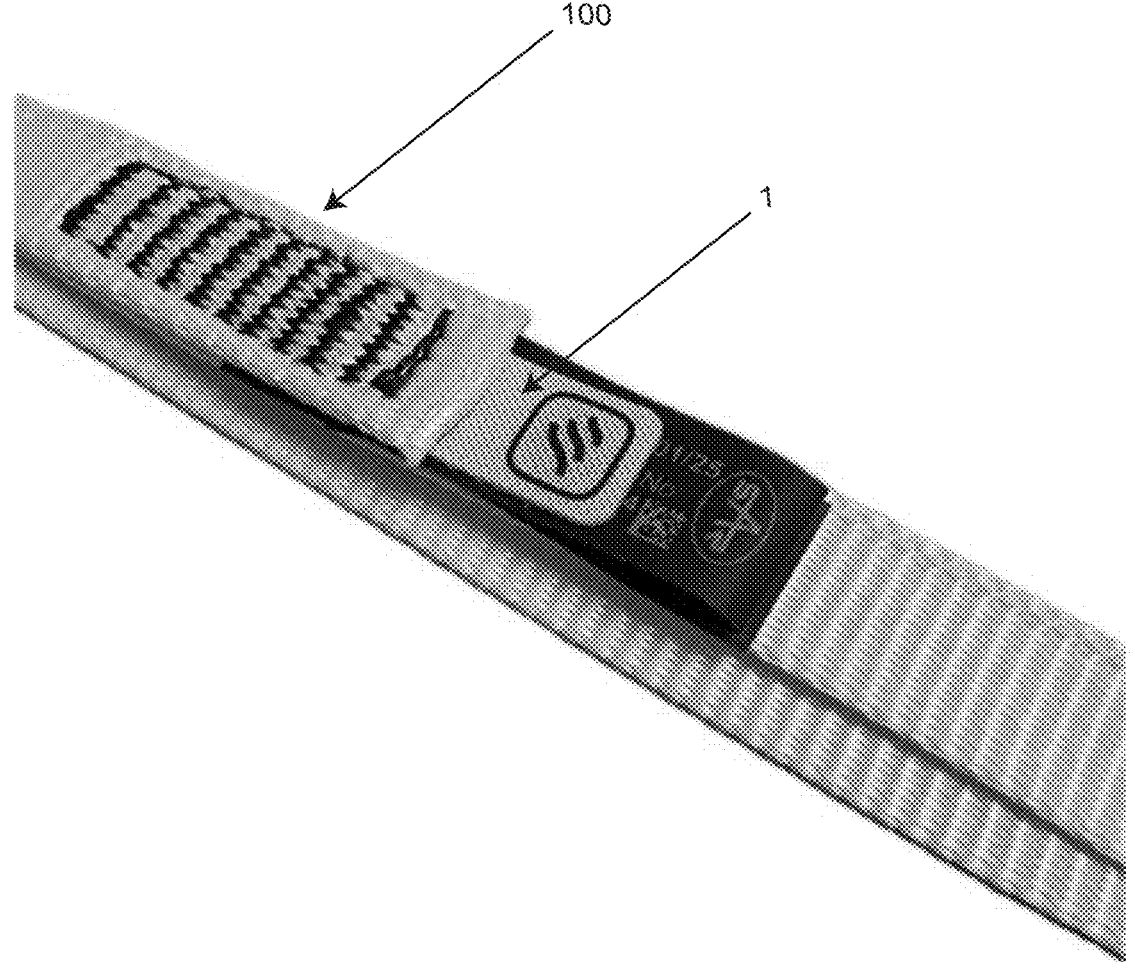
FIG. 7 shows an image of the sewable identifier label stitched to a bar-tack of a sling.

FIG. 6 and FIG. 7 shows an example of the label 1 sewn to an item 100 (a hem and a sling). The items 100 shown are pliable fabrics that move in a variety of directions and in turn, the label 1 is ideally capable of conforming with the fabric movement and not being damaged as a result of this movement.

Figure 8:
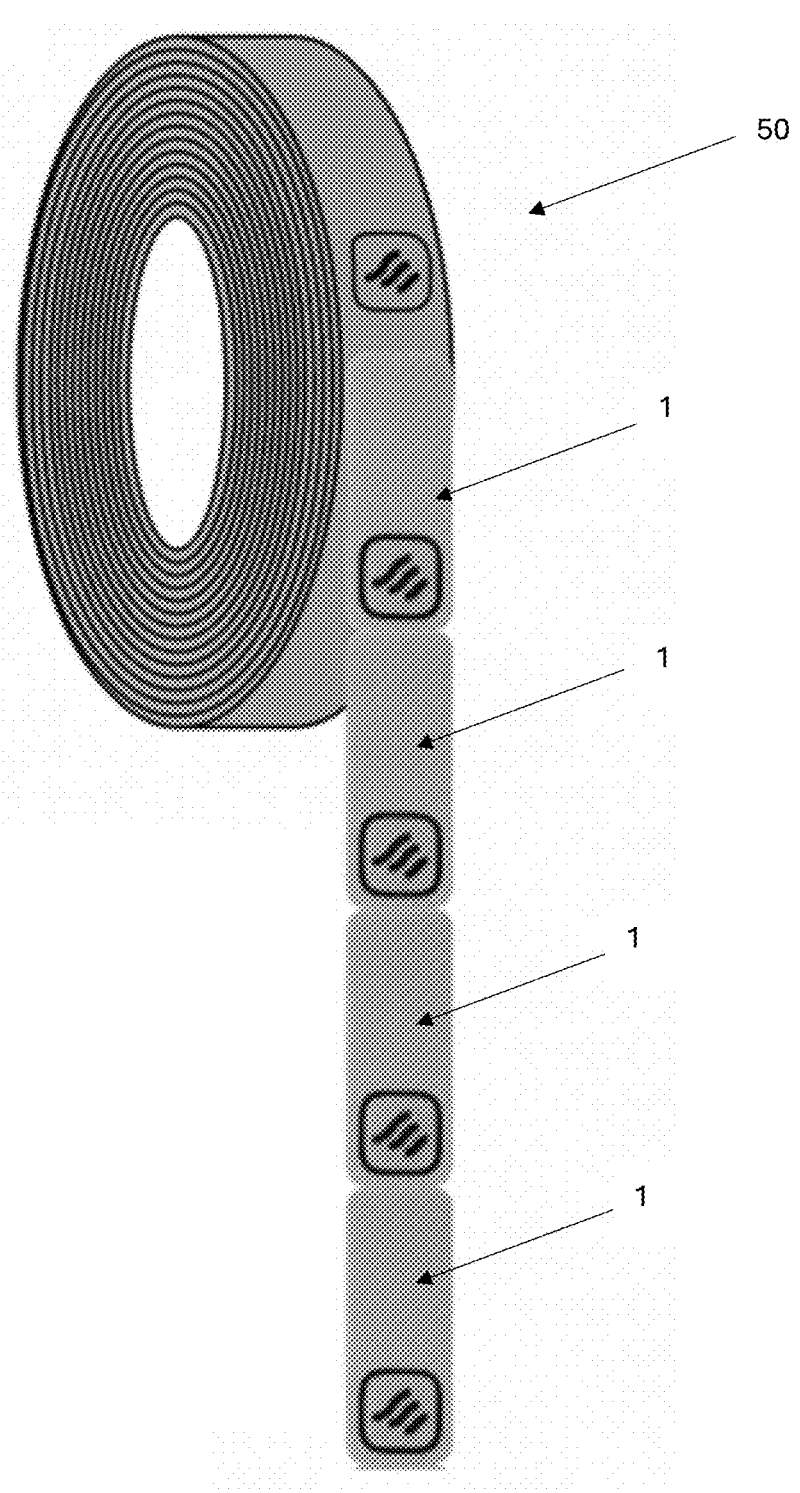
FIG. 8 shows a schematic of a reel of sewable identifier labels partly unrolled.

FIG. 8 shows an example of a reel 50 of labels 1. The multiple labels 1 as shown are connected in series and rolled to form a reel 50 shape. The reel 50 may be fitted to a dispenser (not shown) and an end of the reel 50 of labels 1 run through a label printer (not shown) to set a unique ID for a single or group of labels 1, the label or labels 1 then cut and dispensed.

The label 1 may be fitted to an item 100 by sewing the label 1 onto the item 100. This may as a sew line 9 or tacked to the item 100.

Aspects of the sewable identifier label, an item with a sewable identifier label and methods of manufacture and assembly have been described by way of example only and it should be appreciated that modifications and additions may be made thereto without departing from the scope of the claims herein.

What is claimed is:

1. A sewable identifier label configured to be sewn to an item comprising:
   an identifier tag comprising first and second faces, the identifier tag enclosed within a laminate; and
   wherein the laminate comprises:
   a first porous fabric layer configured to cover the first face of the identifier tag and an area surrounding the identifier tag;
   a second porous fabric layer configured to cover the second face of the identifier tag and an area surrounding the identifier tag; and
   an adhesive applied between:
   the first porous fabric layer and the first face of the identifier tag;
   the second porous fabric layer and the second face of the identifier tag; or
   both the first porous fabric layer and the first face of the identifier tag and the second porous fabric layer and the second face of the identifier tag;
   wherein, when laminated, the adhesive is located at least partly through pores of the first porous fabric layer and pores of the second porous fabric layer and encloses the identifier tag between the first porous fabric layer, the second porous fabric layer and the adhesive.

2. The sewable identifier label as claimed in claim 1 wherein, the sewable identifier label has a thickness of less than 1 mm about an area surrounding the identifier tag within.

3. The sewable identifier label as claimed in claim 1 wherein, the identifier tag is a Near Field Communication (NFC) tag.

4. The sewable identifier label as claimed in claim 1 wherein, the identifier tag is a UHF RFID tag.

5. The sewable identifier label as claimed in claim 1 wherein the identifier tag is a flexible printed circuit (FPC) RFID or NFC tag.

6. The sewable identifier label as claimed in claim 1 wherein the identifier tag is not an inlay.

7. The sewable identifier label as claimed in claim 1 wherein, a porosity, prior to lamination, of the first porous fabric layer and the second porous fabric layer is from 200-800 cm³/cm²/sec at a pressure differential of 125 Pa.

8. The sewable identifier label as claimed in claim 1 wherein, a mass density, prior to lamination, of the first porous fabric layer and the second porous fabric layer is 40-800D.

9. The sewable identifier label as claimed in claim 1 wherein, a fabric weight, prior to lamination, of the first porous fabric layer and the second porous fabric layer is 5-400 g/m².

10. The sewable identifier label as claimed in claim 1 wherein, the first porous fabric layer and the second porous fabric layer are woven fabrics.

11. The sewable identifier label as claimed in claim 1 wherein, the first porous fabric layer and the second porous fabric layer are non-woven fabrics.

12. The sewable identifier label as claimed in claim 1 wherein, the first porous fabric layer and the second porous fabric layer are manufactured from: polypropylene (PPE), polyester, polyaramid, or nylon.

13. The sewable identifier label as claimed in claim 1 wherein, the adhesive is a thermoplastic adhesive that is moisture resistant and non-permeable.

14. The sewable identifier label as claimed in claim 1 wherein, the adhesive is a hot melt adhesive.

15. A reel comprising multiple sewable identifier labels as claimed in claim 1, the multiple sewable identifier labels connected in series and rolled to form a reel shape.

16. An item comprising sewn thereon, a sewable identifier label as claimed in claim 1.

17. The item as claimed in claim 16 wherein, a single stitch line or bar tack is used to sew the sewable identifier label to the item.

18. The item as claimed in claim 16 wherein, the Item is selected from: a fabric item, sling, webbing.

19. The item as claimed in claim 16 wherein, the sewable identifier label is sewn to: edge binding, webbing, a strap, a hem, an internal part of the item.

\* \* \* \* \*